Patented Nov. 3, 1925.

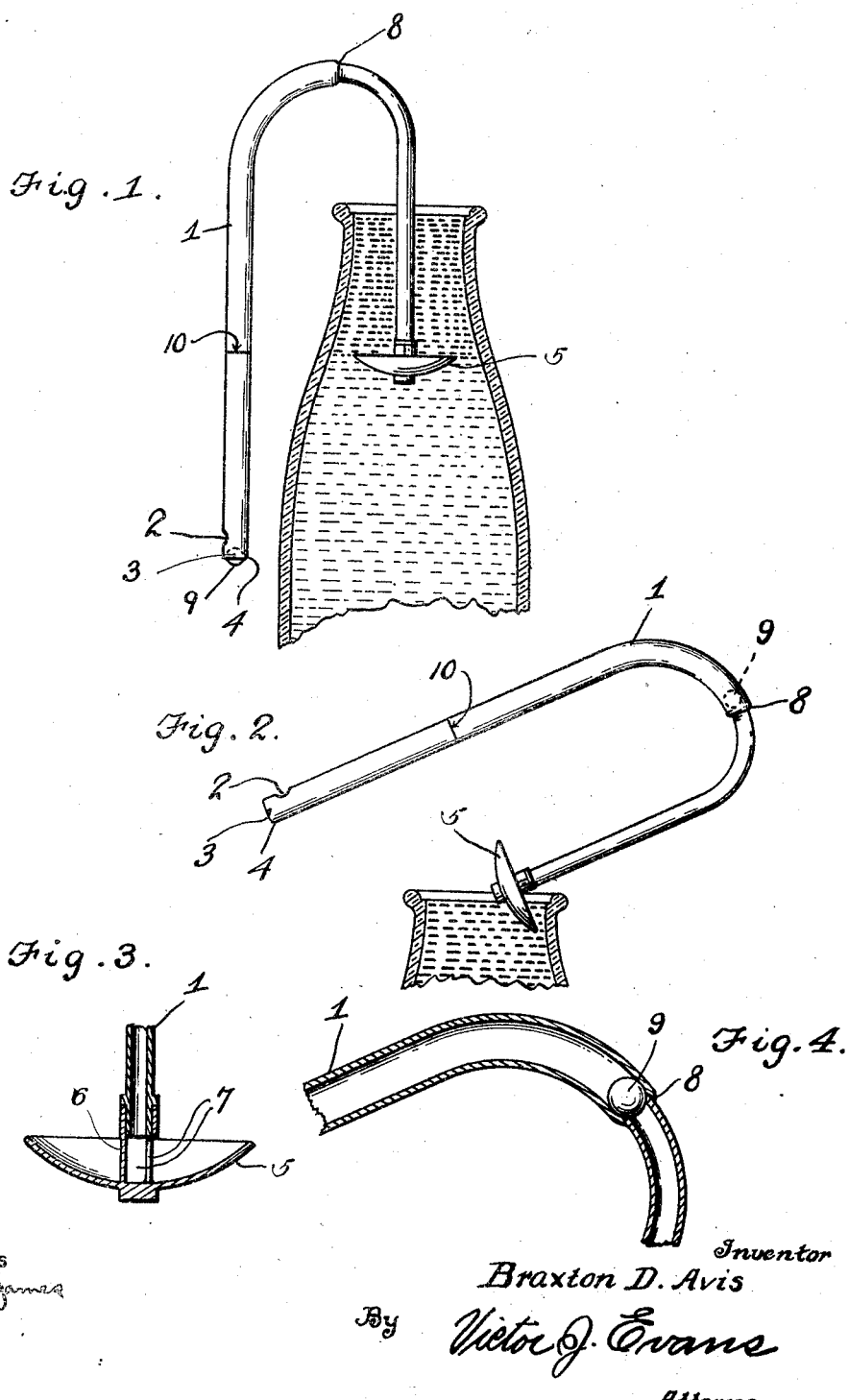

1,560,401

UNITED STATES PATENT OFFICE.

BRAXTON D. AVIS, OF CLARKSBURG, WEST VIRGINIA.

SIPHON CREAM SKIMMER.

Application filed January 4, 1924. Serial No. 684,410.

*To all whom it may concern:*

Be it known that I, BRAXTON D. AVIS, a citizen of the United States, residing at Clarksburg, in the county of Harrison and State of West Virginia, have invented new and useful Improvements in Siphon Cream Skimmers, of which the following is a specification.

This invention relates to a device for removing the cream off milk when contained in milk bottles and the like, the general object of the invention being to provide means for producing a siphon in a goose-neck pipe to draw the cream from the top of the bottle.

Another object of the invention is to provide a deflector at the end of the goose-neck pipe for preventing the milk from entering the device.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view showing how the invention is used.

Figure 2 is a view showing how the device is to be placed in the bottle.

Figures 3 and 4 are detail views.

As shown in these views, the device consists of a U-shaped tubular member, one leg being longer than the other with the long leg provided with a side opening 2 and having its end restricted by slitting the metal, as at 3 and bending the slit portions inwardly, as at 4. The other leg has a cup-shaped member 5 detachably connected therewith by means of a slotted sleeve 6 connected with the center of the member and slidingly engaging the end of the leg last mentioned. By adjusting this member on the leg, the dimensions of the holes 7 in the sleeve can be changed so as to regulate the amount of cream entering the device. The U-shaped member is formed of two sections which are joined together at the bight, as shown at 8. The longer leg is of greater diameter than the shorter one and a ball 9 is placed in the larger section, said ball being of such a size as to fit snugly the interior of the section and it is prevented from entirely leaving the section by the restricted end of the section. A mark 10 is made on the large section on a line with the top of the member 5 so as to indicate the extent to which the device is to be placed in the bottle so as to remove all the cream from the milk. The siphon is formed by the movement of the ball down the larger section which acts to create a vacuum behind the ball and thus draw the cream up through the small section which starts the siphon. The ball passes below the opening 2 so that the cream will flow through said opening. The device is placed in a bottle, as shown in Figure 2, and then it is turned until the legs are practically vertical and just as the device reaches this position the ball will drop from the bight to the restricted end of the large section and thus start the siphon. The cream will then flow until the level in the bottle is below the upper edge of the member 5.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A skimmer of the character described comprising a U-shaped tubular member, a ball freely movable by gravity in one portion of said U-shaped member to start siphonic action therein, and the other portion of said U-shaped member being adapted to be inserted in liquid.

2. A skimmer of the character described comprising a U-shaped member, a ball freely movable by gravity in one portion of said member, a cup shaped member adjustably connected with one end of the U-shaped member and the opposite end being formed with outlet openings and means for preventing the ball from being casually removed from said end.

3. A skimmer of the character described comprising a substantially U-shaped tubular member, a ball freely movable by gravity in one portion of said U-shaped member to start siphonic action therein, means for limiting the movement of said ball at each end of said portion, the other portion of said U-shaped member being adapted to be received in liquid, and said first mentioned portion being provided with an opening adjacent one end to allow exit of said liquid.

In testimony whereof I affix my signature.

BRAXTON D. AVIS.